United States Patent [19]
Nishimura et al.

[11] Patent Number: 5,490,223
[45] Date of Patent: Feb. 6, 1996

[54] PATTERN RECOGNITION APPARATUS

[75] Inventors: Kazuo Nishimura, Hadano; Naotake Natori, Kawasaki, both of Japan

[73] Assignee: Kabushiki Kaisha Toshiba, Kawasaki, Japan

[21] Appl. No.: 227,626

[22] Filed: Apr. 14, 1994

[30] Foreign Application Priority Data

Jun. 22, 1993 [JP] Japan .................. 5-150443

[51] Int. Cl.$^6$ ........................................ G06K 9/62
[52] U.S. Cl. .................... 382/159; 382/161; 382/156; 382/215; 382/227
[58] Field of Search ................... 382/14, 13, 10, 382/3, 38, 57, 159, 161, 156, 215, 227, 187, 309, 310

[56] References Cited

U.S. PATENT DOCUMENTS

| | | | |
|---|---|---|---|
| 4,704,695 | 11/1987 | Kimura et al. | 395/54 |
| 5,263,097 | 11/1993 | Katz et al. | 382/190 |
| 5,285,505 | 2/1994 | Kim et al. | 382/161 |
| 5,315,667 | 5/1994 | Fujisaka et al. | 382/187 |

FOREIGN PATENT DOCUMENTS 3-42767  2/1991  Japan .

Primary Examiner—Leo H. Boudreau
Assistant Examiner—Phuoc Tran
Attorney, Agent, or Firm—Banner & Allegretti, Ltd.

[57] ABSTRACT

A pattern recognition apparatus includes a pattern analyzer for analyzing a similarity between an input pattern and a learning pattern, a hypothetic pattern forming section for forming, as a hypothetic pattern, a predetermined pattern corresponding to the input pattern in accordance with an analysis result from the pattern analyzer, a comparator for comparing the hypothetic pattern formed by the hypothetic pattern forming section with the input pattern, an attribute descriptor in which a comparison result obtained by the comparator and the analysis result obtained by the pattern analyzer are described, and an inference section for, referring to a description described in the attribute descriptor, outputting a clear analysis result obtained from the pattern analyzer as a final recognition result, and starting the hypothetic pattern forming section in response to an ambiguous analysis result by the pattern analyzer.

12 Claims, 11 Drawing Sheets

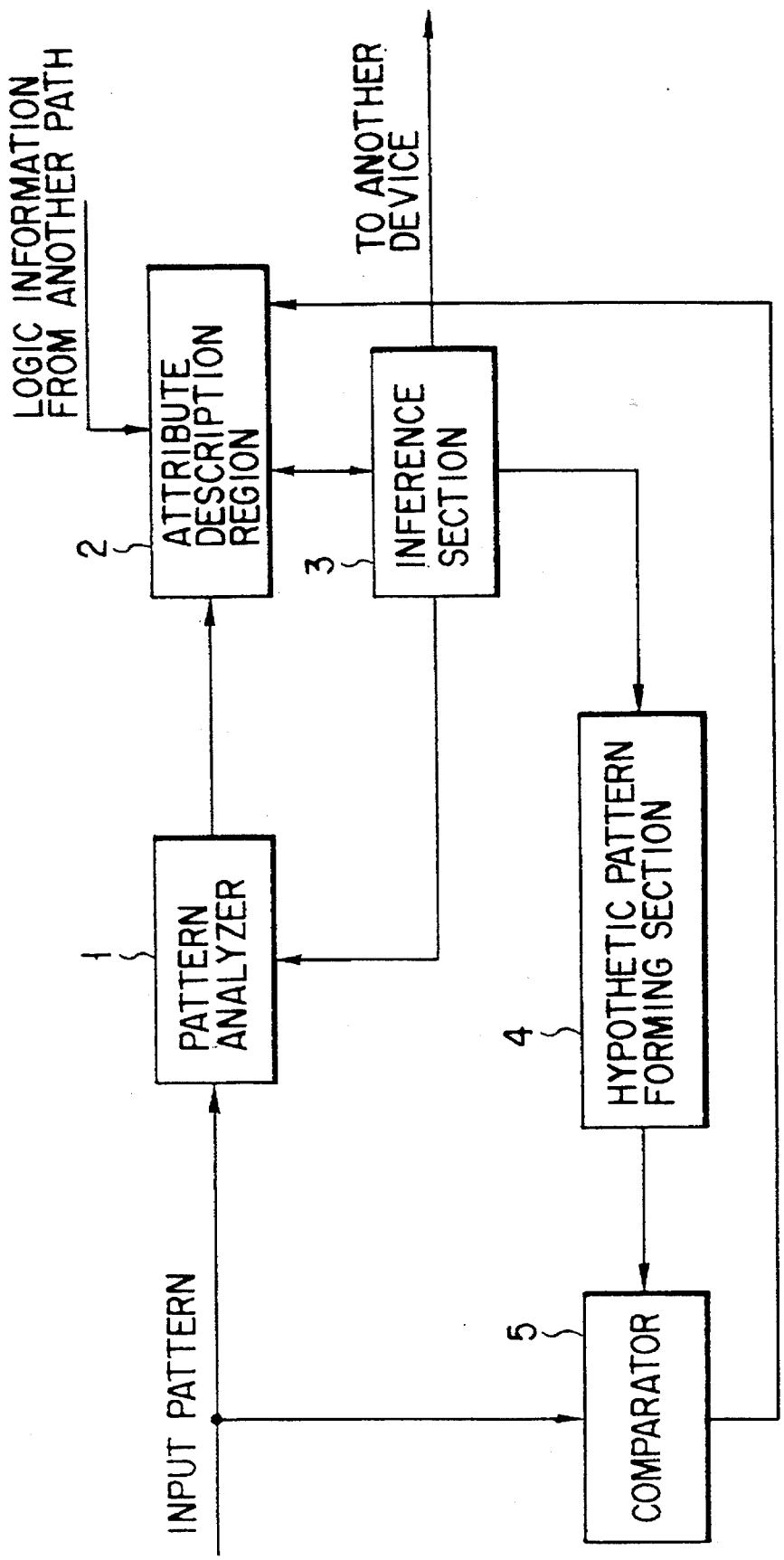
F I G. 1

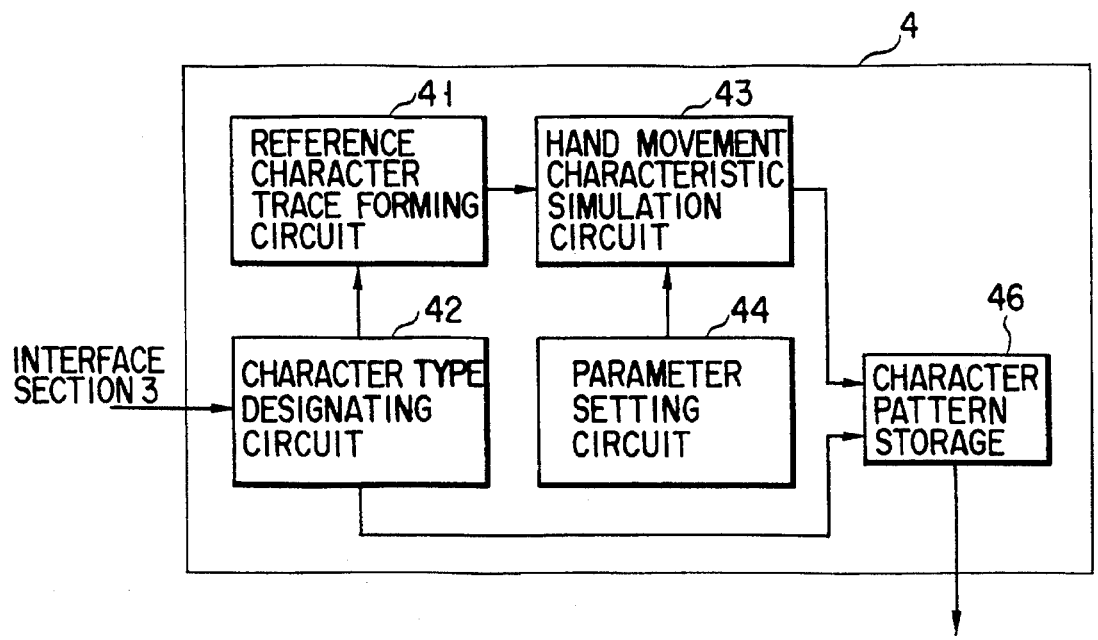
F I G. 2
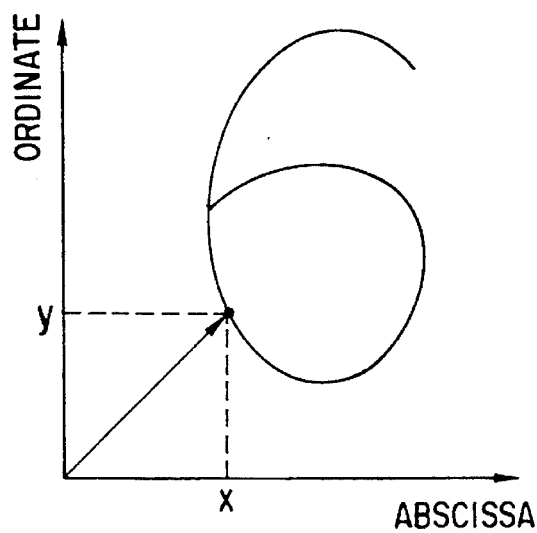
F I G. 3

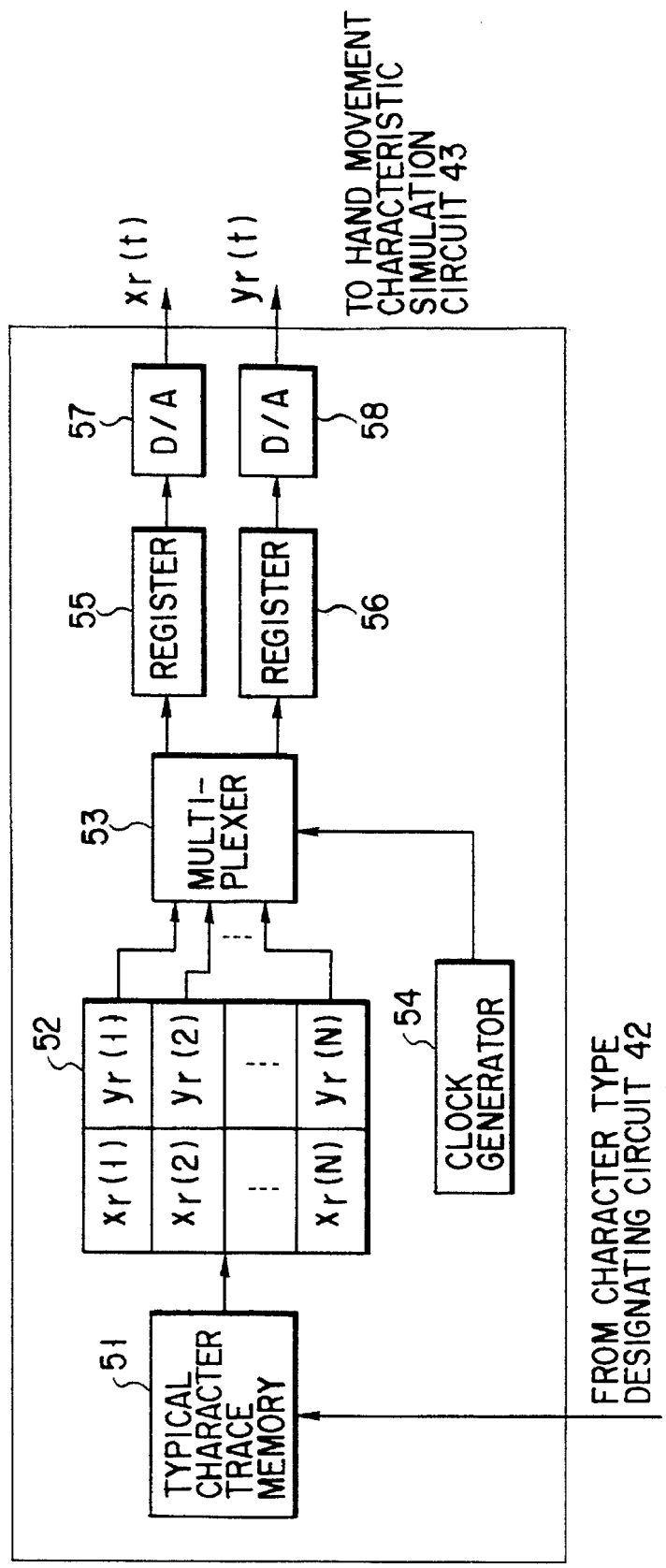
F I G. 4

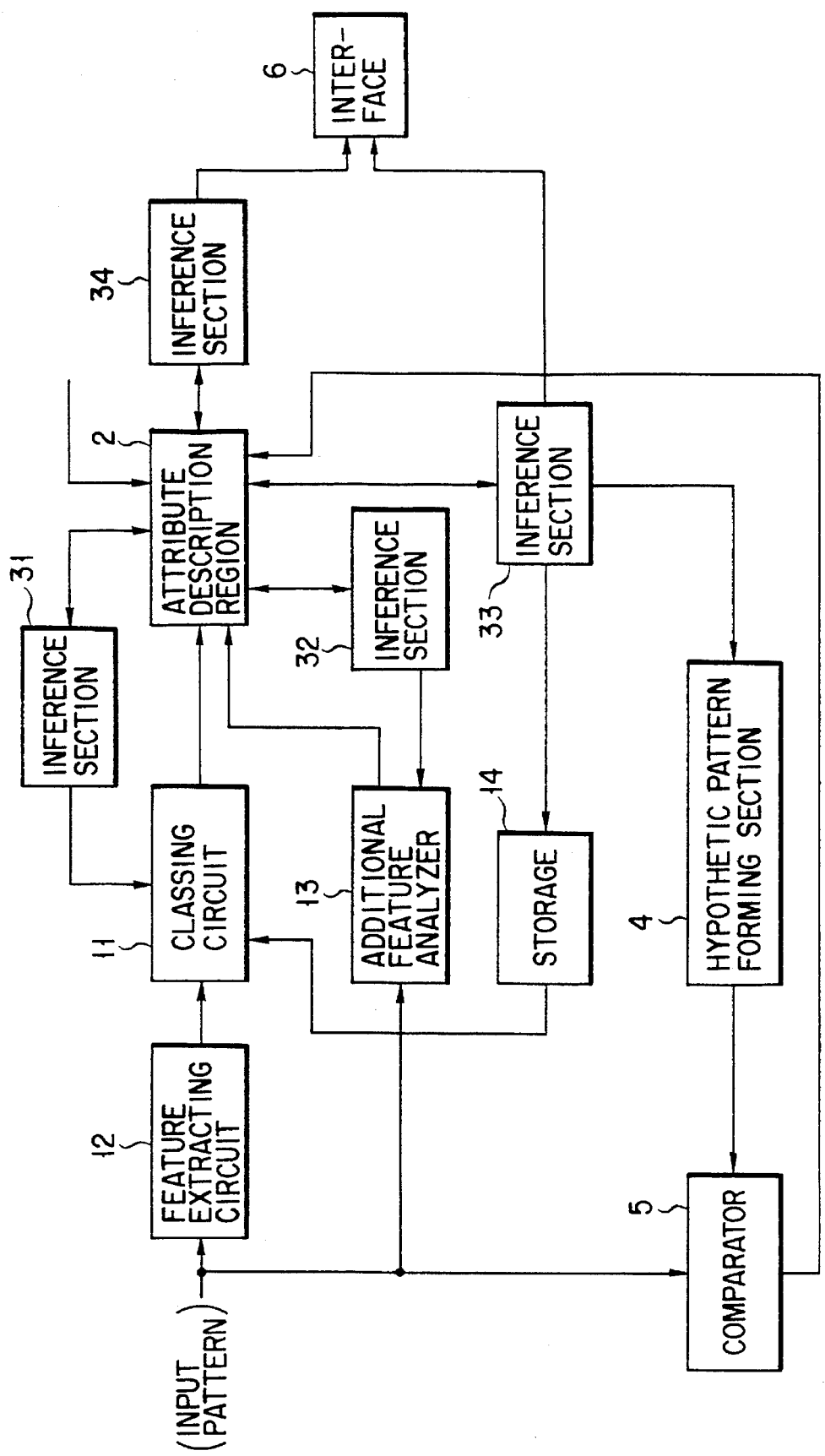
F I G. 10

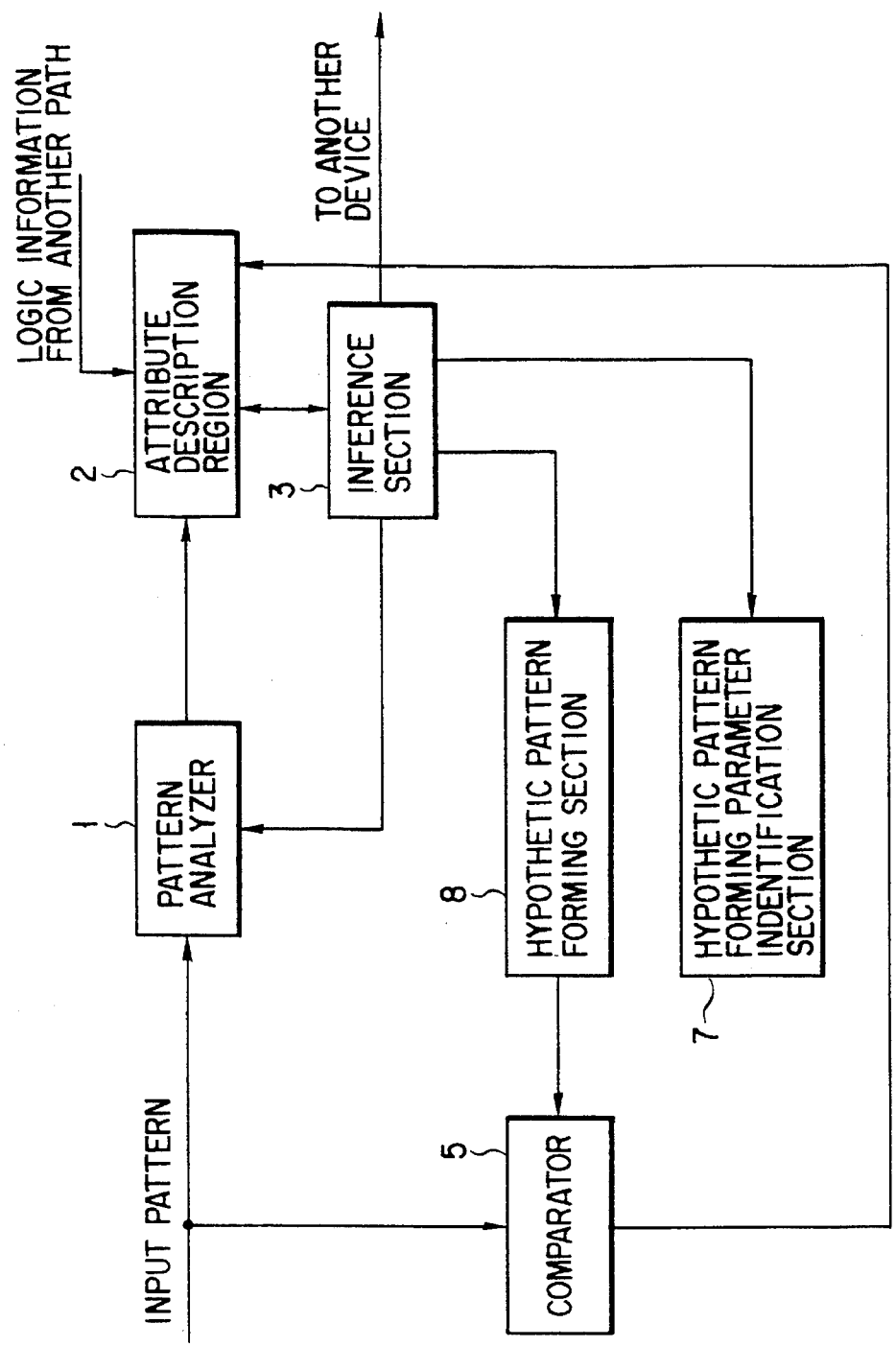
F I G. 11

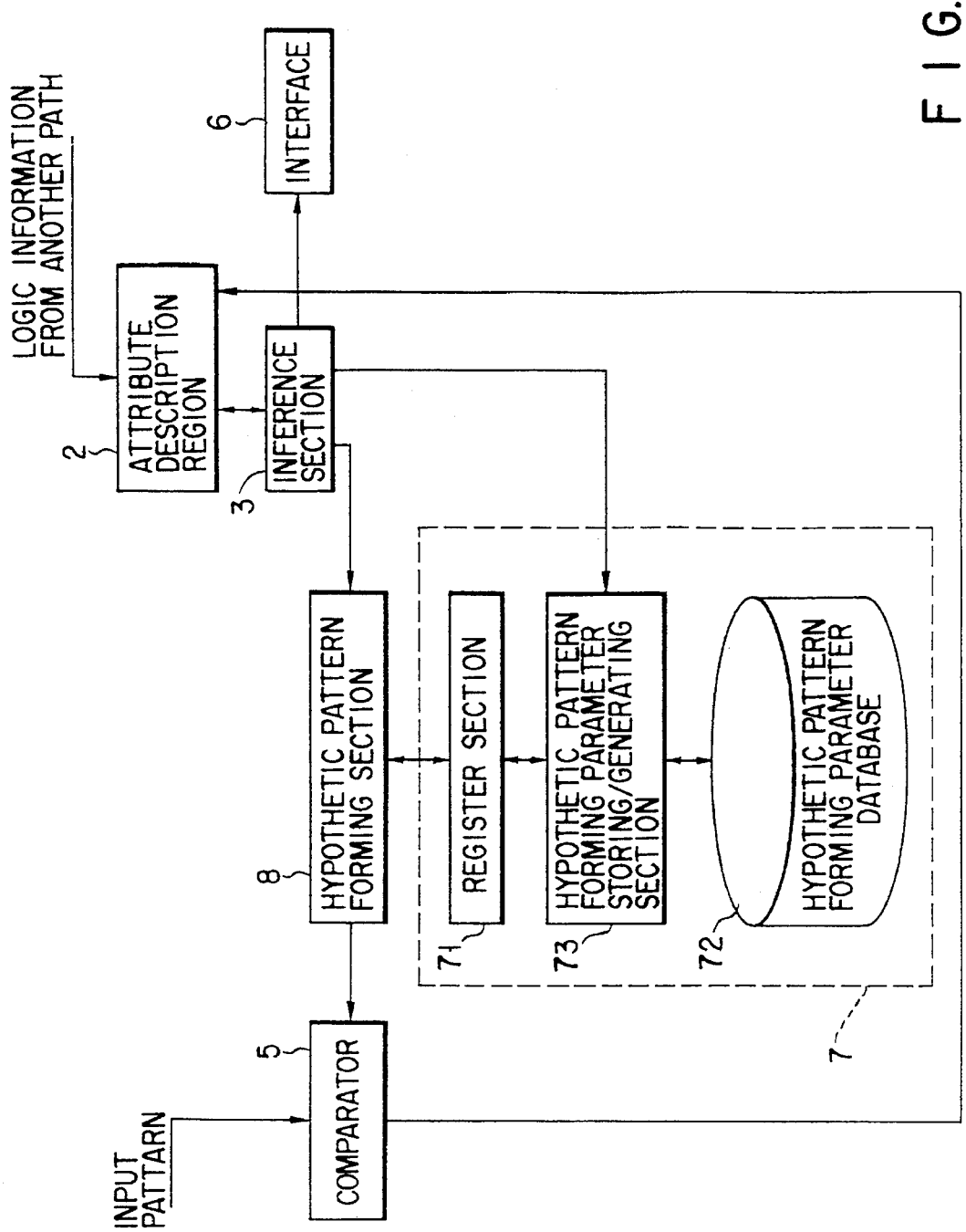

PATTERN RECOGNITION APPARATUS

BACKGROUND OF THE INVENTION

1. Field of the Invention

The present invention relates to a pattern recognition apparatus for recognizing a character pattern or a picture pattern (to be referred to as a pattern hereinafter).

2. Description of the Related Art

A conventional pattern recognition apparatus collates patterns obtained by learning in advance with a newly input pattern to recognize the input pattern.

For example, a character pattern is drawn by white dots and black dots, each white dot is represented by "0", and each black dot is represented by "1". In this case, if the dots are one-dimensionally developed, the character pattern can be represented by a vector consisting of "1" and "0" as follows.

Character pattern=[0, 0, 0, 1, 1, 0, . . . ]

The pattern recognition apparatus recognizes a specific vector space area to which the character pattern belongs on the basis of the vector of the character pattern, thereby classing the input character. A specific vector space area to which a specific character type belongs can be generally determined by a large number of on-the-spot character data.

Although the conventional pattern recognition described above has already been used in character recognition, recognition is performed depending on only information obtained by the input pattern. For this reason, if an input character is considerably deformed, and only incomplete information is obtained, the recognition method depending on only pattern matching has limitations in its recognition capability.

In contrast, man can recognize a character pattern having incomplete information because he/she imaginarily compensate the incomplete portion.

In addition, the above conventional method requires a very large number of pattern data for learning. For example, several thousand to several ten-thousand character patterns must be generally learned for character data, and a very long learning time is required. In contrast, man can also recognize a slightly deformed pattern by learning typical character patterns, and he/she does not learn several ten-thousand patterns. In this manner, the currently used pattern recognition apparatus performs only recognition which is more primitive than the recognition performed by man.

SUMMARY OF THE INVENTION

It is an object of the present invention to provide a pattern recognition apparatus which can recognize a slightly incomplete input pattern and does not require to learn a large number of patterns.

According to the present invention, there is provided a pattern recognition apparatus comprising a pattern analyzer for analyzing a similarity between a learning pattern and an input pattern input to an input section, a hypothetic pattern forming section for forming, as a hypothetic pattern, a predetermined pattern corresponding to the input pattern, a comparator for comparing the input pattern with the hypothetic pattern formed by the hypothetic pattern forming section, an attribute description region (descriptor) in which a comparison result obtained by the comparator and an analysis result obtained by the pattern analyzer are described or stored, and an inference section for outputting, referring to a description described in the attribute description region and related to the input pattern, a clear analysis result representing a clear pattern, which is able to be recognized as a single pattern, as a final recognition result, and starting the hypothetic pattern forming section in response to an ambiguous analysis result representing an ambiguous pattern able to be recognized as a plurality of patterns.

According to the present invention, there is provided a pattern recognition apparatus comprising a pattern analyzer for analyzing a similarity between a learning pattern and an input pattern, a hypothetic pattern forming parameter identification section for generating a hypothetic pattern forming parameter used for forming a hypothetic pattern, a hypothetic pattern forming section for forming a hypothetic pattern similar to the input pattern using the generated hypothetic pattern forming parameter, a comparator for comparing the hypothetic pattern formed by the hypothetic pattern forming section with the input pattern, an attribute description region (descriptor) in which a comparison result obtained by the comparator and an analysis result obtained by the pattern analyzer are described or stored as an attribute, and an inference section for outputting, referring to a description related to the input pattern and described in the attribute description region, a clear analysis result representing a clear pattern, which is able to be clearly recognized as a single pattern, as a final recognition result, staring the hypothetic pattern forming section in response to an ambiguous analysis result representing an ambiguous pattern able to be recognized as a plurality of patterns, and designating the hypothetic pattern forming parameter identification section to store a hysteresis of the hypothetic pattern forming parameter or to generate the hypothetic pattern forming parameter.

In addition, according to the present invention, there is provided a pattern recognition apparatus which includes a pattern analyzer having a function capable of performing learning by using a neural network on the basis of learning data, and a function capable of performing additional learning by using the neural network on the basis of learning data obtained by pairing a determination result obtained by the inference section and an input pattern.

Note that, in the pattern recognition apparatus described above, the hypothetic pattern forming section may be constituted by forming a hypothetic pattern by a predetermined "hand movement characteristic model" or Nishimura's Hand Dynamics Model (NHDM).

In the hypothetic pattern forming parameter identification section, when a comparison result indicates that the hypothetic pattern is similar to the input pattern, hypothetic pattern forming parameters corresponding to the hypothetic pattern and a frequency at which the comparison result indicating the similarity is obtained are recorded, and the generation probability of each recorded hypothetic pattern forming parameter is set on the basis of the frequency. When the hypothetic pattern forming parameters are to be generated, a hypothetic pattern forming parameter having a higher generation probability may be preferentially generated.

According to the present invention, when a very ambiguous, incomplete input pattern is input, a certain pattern formed by the hypothetic pattern forming section as a hypothetic pattern, and the hypothetic pattern is compared with the input pattern. For this reason, the incomplete input pattern can be recognized.

In addition, when a very ambiguous, incomplete input pattern is input, the hypothetic pattern forming section forms a certain pattern as a hypothetic pattern using a hypothetic pattern forming parameter generated by the hypothetic pattern forming parameter identification section, and the hypothetic pattern is compared with the input pattern by the comparator. For this reason, the incomplete input pattern can be recognized.

In this case, the value of a parameter generated when a preferable hypothetic pattern is formed by the hypothetic pattern forming parameter identification section is stored, and the value is used in generation of sequential parameters. For this reason, a time required for setting the parameters can be shortened, and a pattern recognition processing can be performed at a high speed.

Since the pattern analyzer has a function capable of forming a deformation pattern as a hypothetic pattern by itself, a large number of patterns need not be learned.

When the pattern analyzer is omitted, and an input pattern is input, a certain pattern is formed as a hypothetic pattern by the hypothetic pattern forming section, and the hypothetic pattern is compared with the input pattern by the comparator. In this case, even if the input pattern is an incomplete input pat tern, the pattern can be recognized.

When the pattern analyzer is omitted and an input pattern is input, the hypothetic pattern forming section forms a certain pattern as a hypothetic pattern using a hypothetic pattern forming parameter generated by the hypothetic pattern forming parameter identification section, and the hypothetic pattern is compared with the input pattern by the comparator. In this case, even if the input pattern is an incomplete input pattern, the pattern can be recognized.

In addition, the value of a parameter generated when a preferable hypothetic pattern is formed by the hypothetic pattern forming parameter identification section is stored, and the value is used in generation of sequential parameters. For this reason, a time required for setting the parameters can be shortened, and a pattern recognition processing can be performed at a high speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a pattern recognition apparatus according to an embodiment of the present invention;

FIG. 2 is a block diagram showing a hypothetic pattern forming section shown in FIG. 1;

FIG. 3 is a graph showing a character trace represented by two-dimensional coordinates;

FIG. 4 is a block diagram showing a reference character trace forming circuit in FIG. 2;

FIG. 10 is a block diagram showing a pattern recognition apparatus according still another embodiment of the present invention;

FIG. 11 is a block diagram showing a pattern recognition apparatus according still another embodiment of the present invention;

FIG. 15 is a block diagram showing a pattern recognition apparatus according to still another embodiment of the present invention.

DETAILED DESCRIPTION OF THE PREFERRED EMBODIMENTS

Figure 5:
FIG. 5 is a graph showing a change in time of the coordinates of a reference trace.

Embodiments of the present invention will be described below with reference to the accompanying drawings. Note that the same reference numerals denote the same parts throughout the accompanying drawings, and a description thereof will be omitted.

FIG. 1 shows the schematic arrangement of a pattern recognition apparatus according to an embodiment of the present invention. This pattern recognition apparatus comprises a pattern analyzer 1 for receiving an input pattern, an attribute description region (descriptor) 2 for receiving and storing an output from the pattern analyzer 1, an inference section 3 connected to the pattern analyzer 1 and the attribute description region 2, a hypothetic pattern forming section 4 for receiving an output from the inference section 3, and a comparator 5 for receiving the input pattern and an output from the hypothetic pattern forming section 4.

The pattern analyzer 1 analyzes a similarity between an input pattern and a learning pattern by a known statistic method or a method using a neural network. In other words, the pattern analyzer 1 includes a learning circuit, and the learning circuit performs learning for character recognition using input pattern data (given by two-dimensional coordinates, i.e., x and y) and attribute information representing the character type of character pattern data. More specifically, when the neural network constituting the learning circuit has a 3-layer structure including, e.g., S, A, and R layers, learning data from a storage 14 is input to the S layer serving as an input layer, attribute information representing a character type is used as a teaching input for the R layer serving as an output layer, and a learning operation is performed by the known algorithm such as a back propagation method.

More specifically, in the learning circuit, the character type of the input character pattern data is learned as a teaching input for the R layer. For this reason, the learning operation is performed each time new character pattern data is input to the S layer such that an output representing the character pattern data input from the S layer as the learned character type is obtained from the R layer. The result obtained by the learning operation is reflected on weighting coefficients (Wij) of a variable coupling from the S layer to the A layer and a variable coupling from the A layer to the R layer. In other words, each weighting coefficient Wij is used as learning data for character recognition.

The weighting coefficient obtained in the learning circuit as described above is directly transplanted as the weighting coefficient of the variable coupling from the A layer to the R layer to a recognition circuit having the same structure (in this case, 3-layer structure) as that of the learning circuit. In this recognizing circuit, input pattern data is input to the S layer, and a recognition result is output from the R layer. The learning technique of performing learning, using a neural network and accumulating the learning data is described in Kazuo Nishimura and Masahiko Arai: "Power System State Evaluation by Structured Neural Network" International Joint Conference on Neural Networks'90, San Diego, Jun. 17–21, 1990.

The hypothetic pattern forming section 4 forms, as a hypothetic pattern, a pattern which is supposed to be similar to an input pattern. For example, a deformation character trace serving as deformation of a reference character is formed from, e.g., a hand movement characteristic model. Although a detailed arrangement and a detailed operation will be described later, the hypothetic pattern forming section 4 assumes a "hand movement characteristic model" representing the movement of a hand which is drawing a character and forms a deformation character from a typical character using an analog computer or the like. The comparator 5 compares the hypothetic pattern with the input pattern and outputs a comparison result (similarity information) to the attribute description region 2. The attribute description region 2 is constituted by a working memory used in a general expert system, and describes the analysis result obtained by the pattern analyzer 1 and the comparison result obtained by the comparator 5. The inference section 3 also includes rules for con trolling an inference engine and other mechanical units (function units), and performs the following control. In other words, the inference section 3 refers to a description related to the input pattern described in the attribute description region 2, changes the operation of the pattern analyzer 1 on the basis of the description, starts the hypothetic pattern forming section 4, forms a final determination result from the final contents of the attribute description region 2, and sends the result to a display device.

The hypothetic pattern forming section 4 will be described below with reference to FIGS. 2 to 8.

The hypothetic pattern forming section 4 comprises a reference character trace forming circuit 41, a character type designating circuit 42, a hand movement characteristic simulation circuit 43, a parameter setting circuit 44, a display 45, and a character pattern storage 46.

The reference character trace forming circuit 41 represents the typical pattern (e.g., pattern written in a type face, a block style, or a character style close to the type face or the block style) of a character type designated by the character type designating circuit 42, and forms a reference character trace represented by two-dimensional coordinates. More specifically, as shown in FIG. 3, assuming that a character trace is represented by two-dimensional coordinates consisting of an abscissa coordinate x and an ordinate coordinate y, the reference character trace forming circuit 41 generates the trace (reference trace) of the typical character pattern in the form of a time function representing the abscissa and ordinate coordinates of the reference trace. Note that character types represent the types of characters, respectively. For example, when numbers are used, the character types represent "0", "1", "2", . . . . The character type designating circuit 42 selectively designates the character types of reference character traces to be generated by the reference character trace forming circuit 41 one by one.

The reference character trace generated by the reference character trace forming circuit 41 is input to the hand movement characteristic simulation circuit 43. This hand movement characteristic simulation circuit 43 has the hand movement characteristics of man, i.e., a pattern including a "hand movement characteristic model" obtained by simulating the hand movement characteristics obtained when man writes a character. The hand movement characteristic simulation circuit 43 generates, as a character pattern, a deformation character trace represented by two-dimensional coordinates and obtained by simulating deformation caused by handwriting to an input reference character trace. In addition, the movement characteristic model included in the hand movement characteristic simulation circuit 43 includes a plurality of parameters, and these parameters can be variably set by the parameter setting circuit 44.

The character pattern generated by the hand movement characteristic simulation circuit 43 is acquired in the character pattern storage 46 to be used for character recognition, and stored as data together with attribute information representing a character type from the character type designating circuit 42.

FIG. 4 shows the detailed arrangement of the reference character trace forming circuit 41. Referring to FIG. 4, a typical character trace of each character type, e.g., when numbers are used, the typical trace of each of characters "0" to "9" is stored in a typical character trace memory 51 as a discrete value series. In other words, the typical character trace memory 51 stores digital data (to be referred to as trace data hereinafter) obtained by expressing a binary numeral value series $\{(Xr(i\Delta t), yr(i\Delta t)); i=1 \text{ to } N\}$ obtained such that abscissa and ordinate coordinates xr and yr serving as a reference trace are made discrete by a discrete width $\Delta t$ as a function of a time. In this case, reference symbol i represents a discrete time number; and N, the number of data.

When a character type is designated by the character type designating circuit 42, the typical character trace memory 51 transfers trace data corresponding to the character type to a temporary memory 52. The trace data stored in the temporary memory 52 is input to a multiplexer 53, and the trace data is transferred to registers 55 and 56 in an order of i=1, 2, . . . , N in accordance with a clock from a clock generator 54. In other words, the data $xr(i\Delta t)$ and the data $yr(i\Delta t)$ are transferred to the registers 55 and 56, respectively. The data stored in the registers 55 and 56 are converted into analog values by D/A converters 57 and 58, and the analog values are output as the data of time functions $xr(t)$ and $yr(t)$.

FIG. 5 shows an example of the time function $xr(t)$. As shown in FIG. 5, a function representing the reference character trace output from the reference character trace forming circuit 41 changes stepwise. However, when discrete width $\Delta t$ is minimized, the function can be smoothly changed.

The hand movement characteristic simulation circuit 43 will be described below in detail. As shown in FIG. 3, when the trace of a character is represented by two-dimensional coordinates x and y, a "hand movement characteristic model" included in the hand movement characteristic simulation circuit 43 is represented by the following equations:

$$mx'' = \epsilon(xr-x) - rx' \quad (1)$$

$$my'' = \epsilon(yr-y) - ry' \quad (2)$$

where
x: abscissa coordinate of character pattern
y: ordinate coordinate of character pattern
xr: function representing abscissa coordinate of reference trace
yr: function representing ordinate coordinate of reference trace
m: coefficient representing strength of hand inertia
r: friction factor between a writing tool and paper
$\epsilon$: coefficient representing restoring force to reference trace
x': first-order differential coefficient of x
y': first-order differential coefficient of y
x": second-order differential coefficient of x
y': second-order differential coefficient of y In this case, although the functions xr and yr (to be referred to as xr(t) and yr(t) hereinafter when these functions are particularly specified as time functions) are functions of the reference trace given by the reference character trace forming circuit 41, the functions represent the trace of a corresponding character imaginarily drawn by man when he writes the character. Since the second-order differential coefficients of x and y, i.e., x" and y", correspond to an acceleration at which a writing tool moves on paper, the left-hand sides of equations (1) and (2) represent a force acting on the paper by the hand through the writing tool. The first terms of the right-hand sides of equations (1) and (2) represent a force for causing a hand to move back to the reference trace when man writes a character. Since the first-order differential coefficients of x and y, i.e., x' and y' correspond to a speed at which the writing tool moves on the paper, rx' and ry' of the second terms of the right-hand sides of equations (1) and (2) represent a friction force between the writing tool and the paper.

In other words, when man writes a character on paper, he/she imagines the shape (reference character trace) of a character which is to be written by himself/herself, and he/she consciously moves a writing tool along the shape. For this reason, a restoring force (the first terms on the right-hand sides) always acts on the writing tool. The friction force acts such that the restoring force is reduced. In other words, equations (1) and (2) represent that a force acting on paper through a writing tool when man writes a character is obtained by subtracting the friction force from the restoring force. Therefore, it is understood that the equations properly reflect hand movement characteristics.

Figure 6:
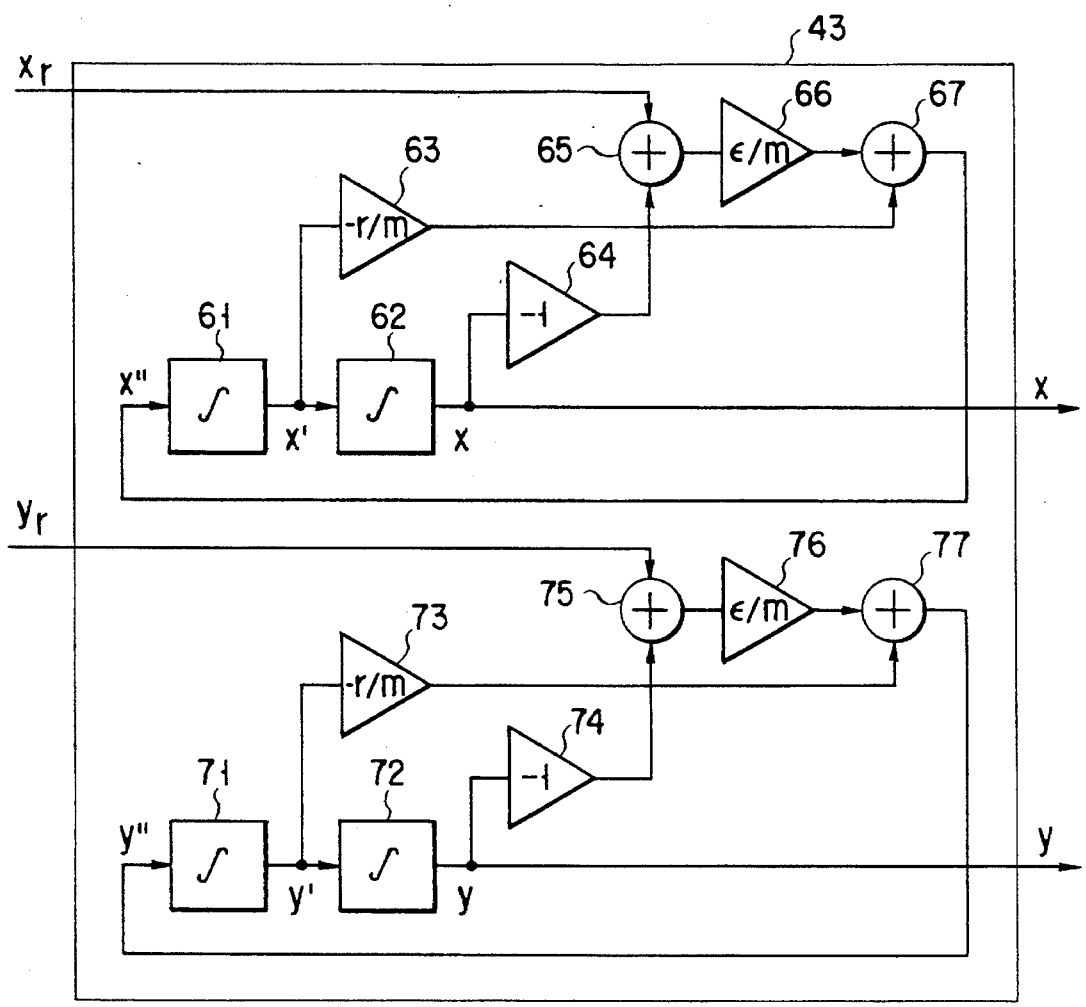
FIG. 6 is a block diagram showing a hand movement characteristic simulation circuit in FIG. 2.

FIG. 6 shows the detailed arrangement of the hand movement characteristic simulation circuit 43 including the "hand movement characteristic model" represented by equations (1) and (2). This arrangement can be realized by analog circuits. Referring to FIG. 6, integrators 61 and 71 integrate the second-order differential coefficients of x and y, i.e., x" and y" to output the first-order differential coefficients x' and y'. Integrators 62 and 72 integrate the first-order differential coefficients x' and y' to output x and y. Inverting amplifiers 63 and 73 have gains of −r/m and amplify the coefficients x' and y' to output −rx'/m and −ry'/m, respectively. Inverting amplifiers 64 and 74 each having a gain of −1 output −x and −y, respectively. Adders 65 and 75 add the outputs −x and −y to the abscissa coordinates xr and yr of the reference trace obtained by the reference character trace forming circuit 41 to output (xr−x) and (yr−y), respectively. Amplifiers 66 and 76 each having a gain of $\epsilon$/m amplify the outputs (xr−x) and (yr−y) to output $\epsilon$(xr−x)/m and $\epsilon$(yr−y)/m, respectively. Adders 67 and 77 add the outputs $\epsilon$(xr−x)/m and $\epsilon$(yr−y)/m from the amplifiers 66 and 76 to the outputs −rx'/m and −ry'/m from the inverting amplifiers 63 and 73 to output {$\epsilon$(xr−x)/m−rx'/m} and {$\epsilon$(yr−y)/m−ry'/m}, respectively. The outputs from the adders 67 and 77 are equal to the second-order differential coefficients of x and y, e.g., x" and y", respectively, and serve as inputs to the integrators 61 and 71.

The parameters (m, r, and $\epsilon$) of the movement characteristic model included in the hand movement characteristic simulation circuit 43 can be independently changed. The parameter setting circuit 44 also performs initial setting of each amplifier in FIG. 6.

With the above arrangement, the abscissa and ordinate coordinates in equation (1) and (2) are output from the hand movement characteristic simulation circuit 43 as information of a character pattern which is simulated for handwritten deformation in accordance with the movement characteristic model.

The trace of the character pattern formed from the abscissa and ordinate coordinates x and y serving as outputs from the hand movement characteristic simulation circuit 43 is displayed on the display 45 as a shape which can be recognized by man. On the other hand, in contrast to the reference character trace forming circuit 41, the character pattern storage 46 converts the abscissa and ordinate coordinates x and y output from the hand movement characteristic simulation circuit 43 into digital data through an A/D converter to store the digital data in a memory.

Figures 7A, 7B, 7C, 9:
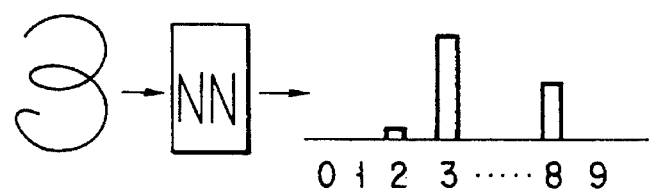
FIGS. 7A to 7C are views showing a reference character and character patterns obtained by deforming the reference character.
FIG. 9 is a view for explaining the function of a hypothetic pattern forming section in FIG. 8.

FIGS. 7A to 7C show examples obtained when a character "4" is formed by the hypothetic pattern forming section 4, in which FIG. 7A shows a reference character trace generated by the reference character trace forming circuit 41 and FIGS. 7B and 7C show character patterns output from the hand movement characteristic simulation circuit 43 and displayed on the display 45. In this case, although the two different character patterns are shown in FIGS. 7B and 7C, when the parameters used in the hand movement characteristic simulation circuit 43 are variably changed under the control of the parameter setting circuit 44, character patterns simulated for various handwritten characters can be formed with respect to one character type.

In the pattern recognition apparatus having the above arrangement, when an input pattern is input to the pattern analyzer 1, the pattern analyzer 1 analyzes a similarity between the input pattern and a learning pattern to describe an analysis result in the attribute description region 2. The inference section 3 refers to the description related to the pattern written in the attribute description region 2 and changes the operation of the pattern analyzer 1 on the basis of the description or starts the hypothetic pattern forming section 4. The hypothetic pattern forming section 4 forms, as a hypothetic pattern, a pattern which is corresponding to the input pattern to output the hypothetic pattern to the comparator 5. In other words, when the hypothetic pattern forming section 4 receives a message representing "a pattern cannot be discriminated between "3" and "8" from the inference section 3, the hypothetic pattern forming section 4 forms a character pattern similar to the characters "3" and "8" to output it to the comparator 5. The comparator 5 compares the hypothetic pattern with the input pattern, and, if the hypothetic pattern is similar to the input pattern, writes the fact in the attribute description region 2. The inference section 3 forms a final determination result from the contents of the attribute description region 2, and sends the final determination result to another device (not shown), e.g., a display device to display the final determination result to make man recognize it.

As a result, even when a very ambiguous, incomplete input pattern is input, a hypothetic pattern is formed, and the input pattern is compared with the hypothetic pattern. For this reason, the incomplete input pattern can be recognized.

Figure 8:
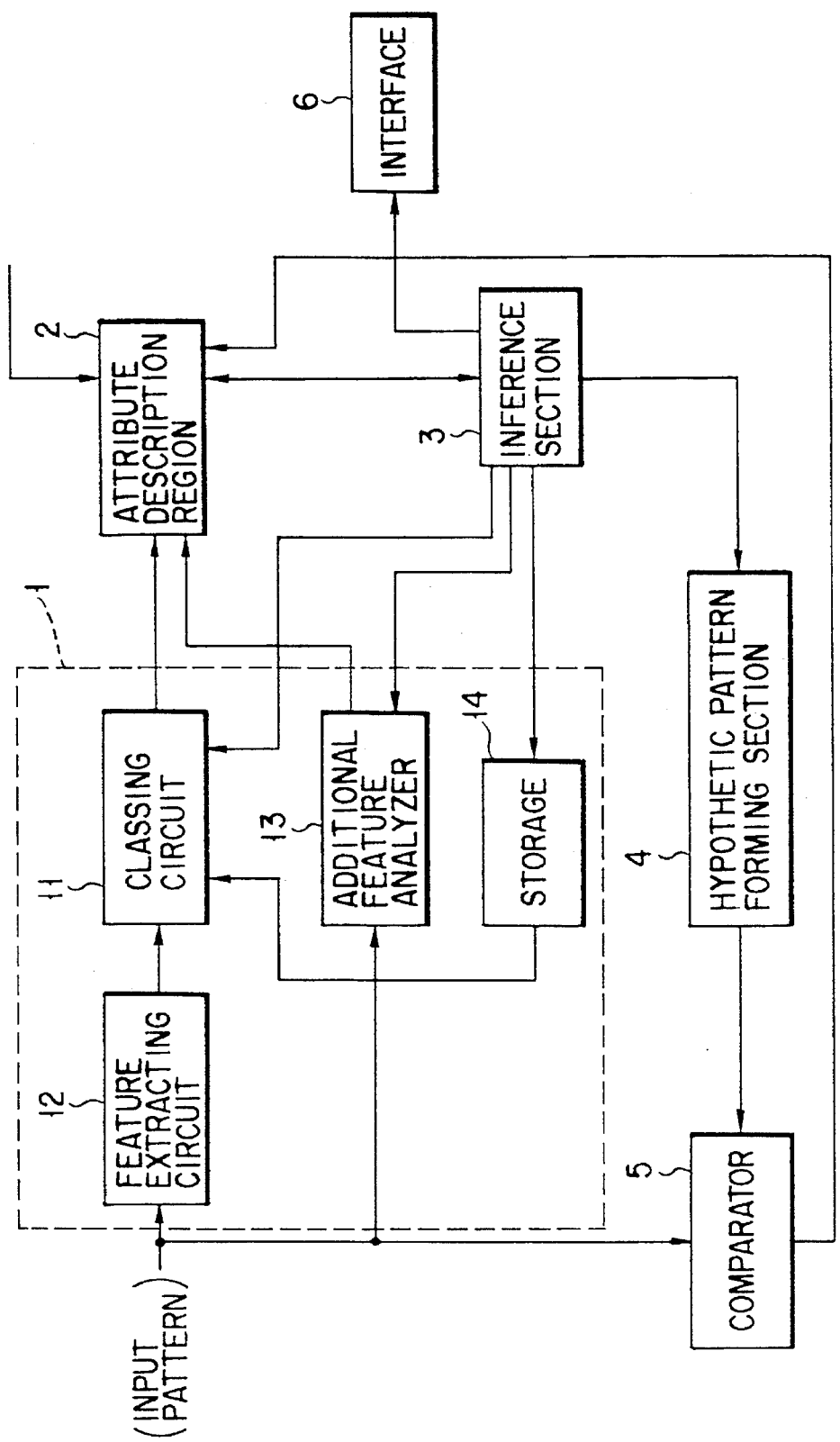
FIG. 8 is a block diagram showing a pattern recognition apparatus according to another embodiment of the present invention.

FIG. 8 shows an embodiment showing the details of the pattern analyzer 1 according to the embodiment in FIG. 1. Referring to FIG. 8, the pattern analyzer 1 is constituted by a classing circuit 11, a feature extracting circuit 12, an additional feature analyzer 13, and a storage 14.

The classing circuit 11 is a processing section obtained by slightly adding a logic processing function to a neural network which associates a character type by pattern matching, and the classing circuit 11 has a function of outputting, to the attribute description region 2, data representing which pattern is input as an input pattern. In this case, in a method of outputting the data, messages such as "pattern is 3", "pattern is very similar to 8", and "pattern cannot be discriminated between "3" or "8"" represented by symbols are used. The feature extracting circuit 12 has functions of processing a character pattern and representing the character pattern in an easily recognizable form to cause the features of the input character pattern to appear. The additional feature analyzer 13 performs an intentional analysis, i.e., analyzes the contour of the character, and performs mathematical processing such as a contour analysis and a spatial frequency analysis. The additional feature analyzer 13, like the classing circuit 11, has a function of describing the analysis result as a message, i.e., "pattern is probably 8" in the attribute description region 2. The storage 14 has a function of pairing the determination result obtained by the inference section 3 and the input character pattern, storing (inputting) the resultant data as the learning data of the classing circuit 11, and outputting the stored data as the learning data of the classing circuit 11.

An operation of the pattern recognition apparatus having the arrangement shown in FIG. 8 will be described below.

A character pattern input to the pattern analyzer 1 is processed by the feature extracting circuit 12 such that the features of the character pattern clearly appear, and this processed character pattern is classed into types, e.g., "pattern is 3", "pattern is probably 8", and "pattern cannot be discriminated between 3 and 8" by the classing circuit 11. A corresponding message is described in the attribute description region 2.

When the content described in the attribute description region 2 is a confirmed message, e.g., "pattern is 3", the inference section 3 sends the determination result to an interface 6. On the other hand, when the content described in the attribute description region 2 is an ambiguous message, e.g., "pattern cannot be discriminated between 3 and 8", in other words, "a pattern can be recognized as both 3 and 8", the inference section 3 starts the additional feature analyzer 13 to obtain information required to discriminate the unclear portion. In this manner, when the additional feature analyzer 13 analyzes the contour of the character. When a message, e.g., "pattern is probably 8", is obtained as the analysis result, the inference section 3 describes the analysis result in the attribute description region 2. In this manner, when the input character pattern is decided, the inference section 3 sends the result to the interface 6. Even when an analysis is performed by the additional feature analyzer 13, the type of the input character cannot be confirmed, the inference section 3 starts the hypothetic pattern forming section 4. Although the above processing is a bottom-up processing for extracting information from the input pattern, the hypothetic pattern forming section 4 forms the hypothetic pattern using a top-down processing. For example, hypothetic patterns similar to "3 and 8" as shown in FIG. 9 are formed by the hypothetic pattern forming section 4 when a message is "pattern is probably 8" or "pattern cannot be discriminated between 3 and 8".

In this case, an operation of the hypothetic pattern forming section 4 will be described below with reference to FIG. 9. FIG. 9 shows a processing of comparing an input pattern with a hypothetic pattern formed by the hypothetic pattern forming section 4.

Although an output from the neural network in the classing circuit 11 is described in the attribute description region 2 as a message, the hypothetic pattern forming section 4 associates typical patterns of "3" and "8" at a proper frequency with reference to the message, and forms deformation character patterns of the typical patterns. Since a hypothetic pattern corresponding to the input pattern is finally formed, the comparator 5 describes a message such as "pattern is assumed as 3" in the attribute description region 2.

The inference section 3 refers all messages accumulated in the attribute description region 2 by the above processing to determine the input character, and sends the determination result to the interface 6.

The determination of the above embodiment utilizes not only the messages described in the attribute description region 2 but also logic information acquired by a means (not shown). A certain character can be estimated to some extent from the characters arranged before and after the certain character. For example, in English, a character between "ti" and "n" is probably "o". Such information can be used to compensate for incomplete information. The inference section 3 uses information acquired by other processing described above to perform determination.

The inference section 3 pairs the above determination result and the input character pattern and gives the paired data to the storage 14 as the learning data of the classing circuit 11. The classing circuit 11 receives the learning data from the storage 14 causes the neural network of the classing circuit 11 to additionally learn the learning data. Since the classing circuit 11 has a function of forming a deformation pattern by itself to cause the neural network to learn the deformation pattern, a large number of character patterns need not be learned by the neural network. The neural network gradually networks the learning data through recognition experiences to improve the performance of the neural network. For this reason, the neural network need learn only a very small number of typical patterns at first, and a problem caused by a learning time is reduced.

According to the embodiment described above, when a very ambiguous, incomplete input pattern is input, a certain pattern is formed as a hypothetic pattern, and the hypothetic pattern is compared with the input pattern. For this reason, the incomplete input pattern can be recognized. In addition, since the pattern recognition apparatus has a function of forming a deformation pattern as a hypothetic pattern by itself, the pattern recognition apparatus need not learn a large number of patterns.

FIG. 10 shows another embodiment of the present invention. An inference section 3 used in the above embodiment is divided into a plurality of inference sections 31, 32, 33, and 34. Each of these inference sections includes a rule group corresponding to a specific purpose, and an inference engine is assigned to each rule group. In other words, the inference section 31 is arranged parallel to an attribute description region 2 and a classing circuit 11, the inference section 32 is arranged between the attribute description region 2 and an additional feature analyzer 13, the inference section 33 is arranged between the attribute description region 2, a storage 14, an interface 6, and a hypothetic pattern forming section 4, and the inference section 34 is arranged between the at tribute description region 2 and the interface 6.

Note that in each of the above embodiments, although a hypothetic pattern forming section for forming deformation character trace from hand movement characteristics is used as the hypothetic pattern forming section 4, the hypothetic pattern forming section 4 is not limited to this, and the following hypothetic pattern forming section may be used. In other words, a hypothetic pattern forming section using a database storing deformation characters, i.e., a hypothetic pattern forming section using a database storing modifications of a character type, may be used. In addition, a hypothetic pattern forming section for forming a character trace by a deformation rule, i.e., a hypothetic pattern forming section for devising a deformation rule with respect to each character type to form a deformation character from a typical character, may be used.

A pattern recognition apparatus will be described in which a time required for setting a hypothetic pattern forming parameter used for forming a hypothetic pattern is shortened to perform a pattern recognition processing at a high speed.

As shown in FIG. 11, this pattern recognition apparatus comprises a pattern analyzer 1, an attribute description region 2, an inference section 3, a hypothetic pattern forming section 8, a comparator 5, and a hypothetic pattern forming parameter identification section 7.

The pattern analyzer 1 analyzes a similarity between an input pattern and a learning pattern by a known statistic method or a method using a neural network as in the first embodiment. The hypothetic pattern forming section 8 forms, as a hypothetic pattern, a pattern which is supposed to be similar to the input pattern, e.g., forms a deformation character trace from hand movement characteristics. More specifically, the hypothetic pattern forming section 8 assumes a "hand movement characteristic model" to form a deformation character from a typical character using an analog computer. A means for forming a deformation character such as a "hand movement characteristic model" includes several parameters. When the means receives a parameter, the means forms a deformation character corresponding to the parameter. Although the hypothetic pattern forming section 4 in the embodiment of FIG. 1 generates a hypothetic pattern forming parameter by itself, the hypothetic pattern forming section 8 is different from the hypothetic pattern forming section 4 in the following points. The hypothetic pattern forming section 8 reads the hypothetic pattern forming parameter generated by the hypothetic pattern forming parameter identification section 7.

The hypothetic pattern forming parameter identification section 7 generates a hypothetic pattern forming parameter used in the hypothetic pattern forming section 8. For example, the hypothetic pattern forming parameter identification section 7 stores the frequency distribution of the value of a hypothetic pattern forming parameter generated when a hypothetic pattern corresponding to the input pattern is obtained, and the hypothetic pattern forming parameter identification section 7 generates the value of the hypothetic pattern forming parameter in consideration of the frequency distribution. In other words, the hypothetic pattern forming parameter identification section 7 sequentially generates hypothetic pattern forming parameters from a hypothetic pattern forming parameter having a higher generation frequency toward that having a lower generation frequency.

The comparator 5 compares the hypothetic pattern with the input pattern. The attribute description region 2 is constituted by a working memory used in a normal expert system, and describes an analysis result obtained by the pattern analyzer 1 or a comparison result obtained by the comparator 5. The inference section 3 also includes a rule for controlling the inference engine and other mechanical units (function units), and performs the following control. In other words, the inference section 3 refers to a description related to the input pattern described in the attribute description region 2, changes the operation of the pattern analyzer 1 on the basis of the description, starts the hypothetic pattern forming section 8, outputs commands for storing the value of a hypothetic pattern forming parameter and generating a hypothetic pattern forming parameter to the hypothetic pattern forming parameter identification section 7, forms a final determination result from the final contents of the attribute description region 2, and sends the result to a display.

In the pattern recognition apparatus having the above arrangement, when an input pattern is analyzed by the pattern analyzer 1, the determination result is described in the attribute description region 2. In the inference section 3, a description related to a pattern written in the attribute description region 2 is referred to, the operation of the pattern analyzer 1 is changed on the basis of the description, the hypothetic pattern forming section 8 is started, or the hypothetic pattern forming parameter identification section 7 is designated to store the value of a hypothetic pattern forming parameter or generate a hypothetic pattern forming parameter. The hypothetic pattern forming section 8 forms, as a hypothetic pattern, a pattern corresponding to the input pattern, and sends it to the comparator 5. At this time, the hypothetic pattern forming parameter identification section 7 stores, e.g., the frequency distribution of the value of a hypothetic pattern forming parameter generated when a hypothetic pattern corresponding to the input pattern is obtained, and the hypothetic pattern forming parameter identification section 7 generates the value of the hypothetic pattern forming parameter used in the hypothetic pattern forming section 8 in consideration of the frequency distribution. The comparator 5 compares the hypothetic pattern with the input pattern. If the hypothetic pattern is similar to the input pattern, this fact is sent to the attribute description region 2. The inference section 3 forms a final determination result from the contents of the attribute description region 2, and the determination result is displayed on another device (not shown), e.g., display device.

As a result, when an incomplete input pattern is input, and a hypothetic pattern is formed with respect to the input pattern, the value of a hypothetic pattern forming parameter generated when a hypothetic pattern corresponding to the input pattern and stored in the hypothetic pattern forming parameter identification section 7 is utilized. Therefore, a time required for setting the parameter can be shortened.

Figure 12:
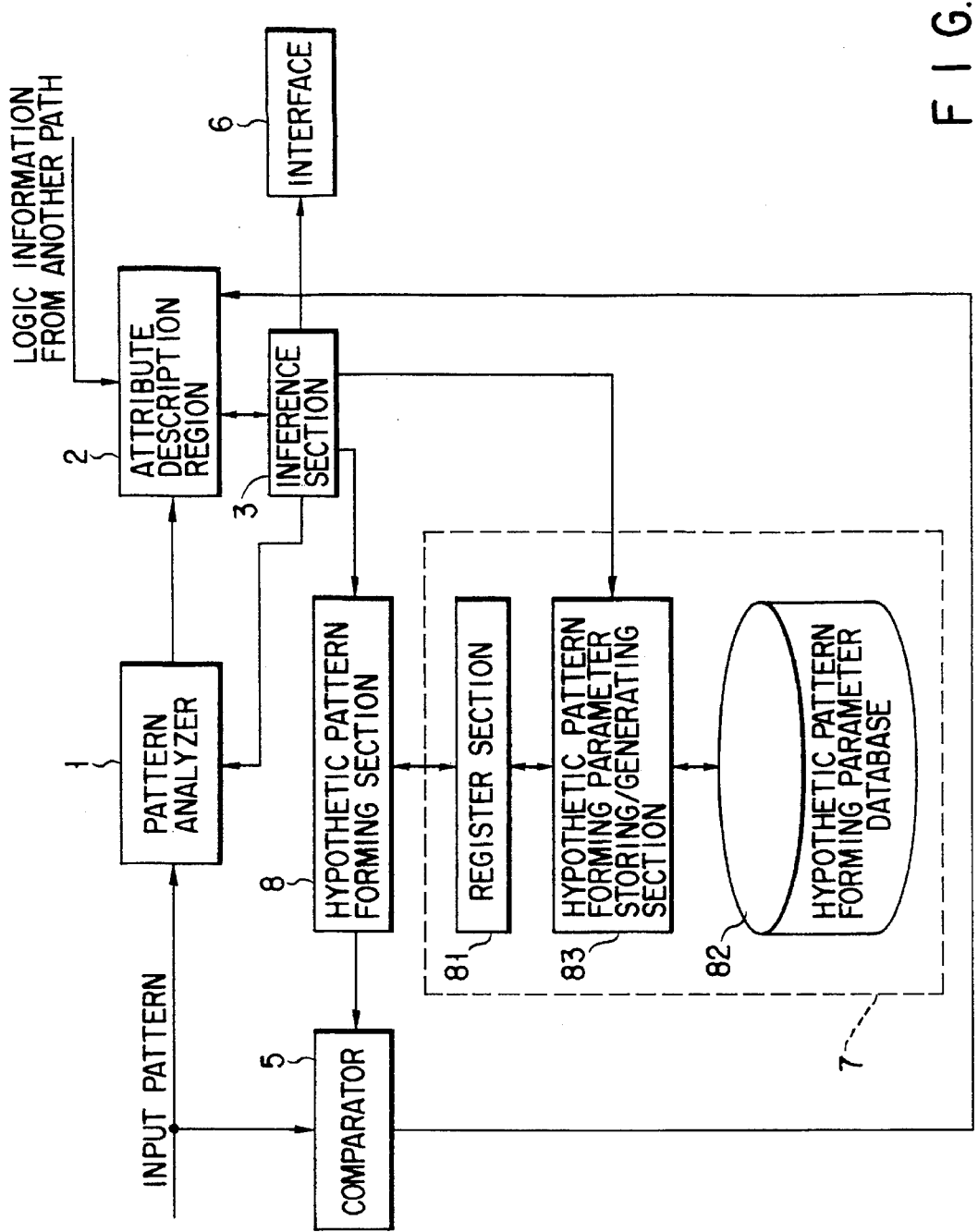
FIG. 12 is a block diagram showing a pattern recognition apparatus according still another embodiment of the present invention.

FIG. 12 shows still another embodiment of the present invention. This embodiment is different from the embodiment in FIG. 11 in the following point. In other words, a hypothetic pattern forming parameter identification section 7 shown in FIG. 11 comprises a register section 81, a hypothetic pattern forming parameter database 82, and a hypothetic pattern forming parameter storing/generating section 83.

The register section 81 temporarily stores a generated hypothetic pattern forming parameter. For example, when the hypothetic pattern forming parameter is constituted by a and b, the contents of the register section 81 are "a=1, b=2" or the like. The hypothetic pattern forming parameter database 82 stores the frequency distribution of a hypothetic pattern forming parameter generated when a preferable hypothetic pattern is formed. The hypothetic pattern forming parameter storing/generating section 83 has functions of loading, e.g., the value of the hypothetic pattern forming parameter generated when the preferable hypothetic pattern is formed, from the register section 81 in accordance with designation of an inference section 3, storing the value in the hypothetic pattern forming parameter data base 82 as a frequency distribution, efficiently generating a hypothetic pattern forming parameter using the frequency distribution of the hypothetic pattern forming parameter stored in the hypothetic pattern forming parameter data base 82, and writing the hypothetic pattern forming parameter in the register section 81.

An operation of the embodiment in FIG. 12 will be described below.

A character pattern input to a pattern analyzer 1 is described in an attribute description region 2 to have the form such as "pattern is 3", "pattern is very similar to 8", or "pattern cannot be discriminated between 3 and 8" in accordance with the attribute of the input character pattern. When the content described in the attribute description region 2 is a confirmed message, e.g., "pattern is 3", the inference section 3 sends the determination result to an interface 6. On the other hand, when the content described in the attribute description region 2 is an ambiguous message, e.g., "pattern cannot be discriminated between 3 and 8" or "pattern is very similar to 8", the inference section 3 changes the operation of the pattern analyzer 1 to obtain information required to discriminate the unclear portion, thereby analyzing the character pattern in detail, when the input character pattern can be confirmed by the above processing, the inference section 3 sends the result to the interface 6. If the input character type cannot be confirmed even when the above analysis is performed, the inference section 3 starts a hypothetic pattern forming section 8 to designate the hypothetic pattern forming parameter storing/generating section 83 to generate a hypothetic pattern forming parameter. Although the above processing is a bottom-up processing for extracting information from the input pattern, the hypothetic pattern forming section 8 forms the hypothetic pattern using a top-down processing. The hypothetic pattern forming section 8 associates typical patterns of "3" and "8" at a proper frequency with respect to a message, e.g., "pattern cannot be discriminated between 3 and 8" in accordance with the message, and the hypothetic pattern forming section 8 loads a hypothetic pattern forming parameter from the register section 81 to form a deformation character of each of the typical patterns. When a hand movement characteristic model is used, the hypothetic pattern forming section 8 forms a deformation character as follows. In other words, the position vector of a characteristic point constituting a typical pattern on a two-dimensional plane is given by:

$$Xr = \{(xr1, yr1), \ldots, (xrn, yrn)\}$$

For example, an equation of motion:

$$mXr'' + rXr' = \epsilon(Xr - X)$$

is solved to calculate the following position vector, $$X = \{(x1, y1), \ldots, (xn, yn)\}$$

where m is a parameter representing the strength of hand inertia, r, a parameter representing a friction force related to a strength of pen-stroke or paper quality, and $\epsilon$, a parameter representing a restoring force to a reference trace. These parameters correspond to hypothetic pattern forming parameters. When a hypothetic pattern which is supposed to be similar to the input pattern is formed, a message such as "pattern is assumed as 3" is written in the attribute description region 2 by a comparator 5.

The hypothetic pattern forming parameter storing/generating section 83 stores, in the form of a frequency distribution, the value of a hypothetic pattern forming parameter generated when the hypothetic pattern which is supposed to be similar to an input pattern in the hypothetic pattern forming parameter data base 82, or the hypothetic pattern forming parameter storing/generating section 83 efficiently generates a hypothetic pattern forming parameter using the frequency distribution of the value of a hypothetic pattern forming parameter stored in the hypothetic pattern forming parameter data base 82, and writes the generated hypothetic pattern forming parameter in the register section 81.

An operation of the hypothetic pattern forming parameter identification section 7 will be described below with reference to FIGS. 13 and 14.

Figure 13:
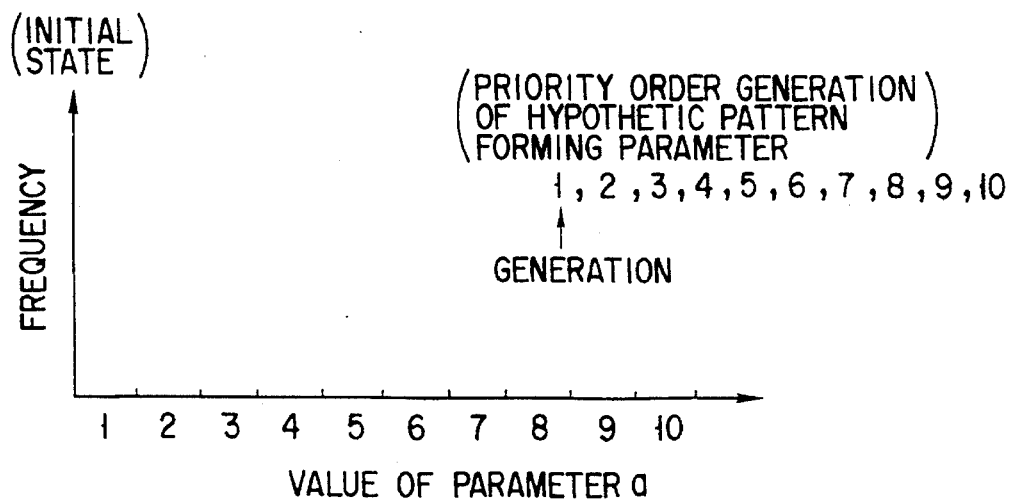
FIG. 13 is a graph for explaining the function of a hypothetic pattern forming parameter identification section in FIG. 12.
Figure 14:
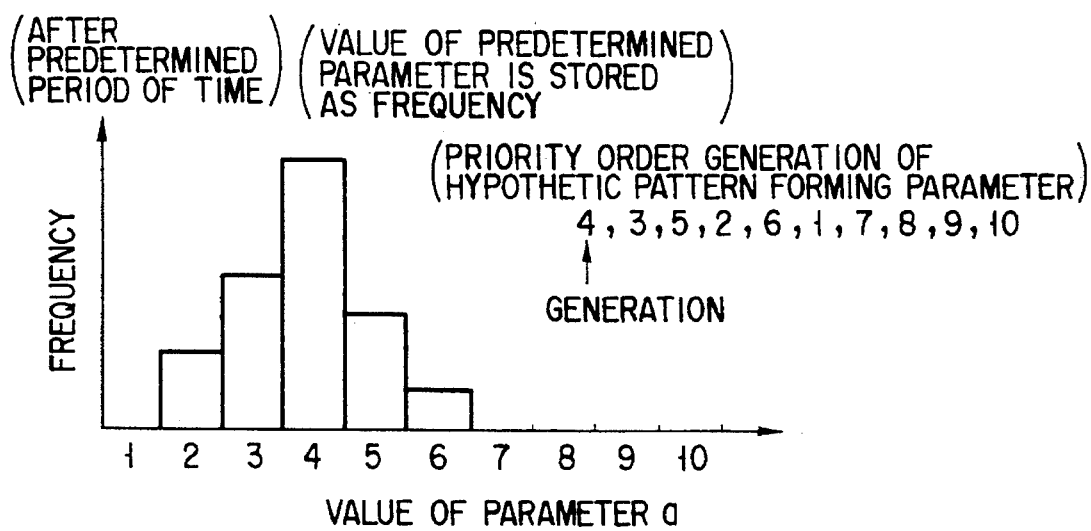
FIG. 14 is a graph for explaining the function of the hypothetic pattern forming parameter identification section in FIG. 12.

A processing of storing the frequency distribution of a hypothetic pattern forming parameter and generating the hypothetic pattern forming parameter using the frequency distribution is shown in FIGS. 13 and 14. In this case, the value of a hypothetic pattern forming parameter a is set to be a natural number which is 10 or less. As shown in FIG. 13, an initial state in which no frequency distribution of a hypothetic pattern forming parameter is stored is regarded as a state in which no hypothetic pattern forming parameter identification section 7 is arranged. In other words, a hypothetic pattern forming parameter is generated at random. However, as shown in FIG. 14, when the value of a hypothetic pattern forming parameter generated when a hypothetic pattern corresponding to the input pattern is stored in the hypothetic pattern forming parameter data base 82 as a frequency distribution, the value of a hypothetic pattern forming parameter having a higher frequency is preferentially generated. When the hypothetic pattern which is supposed to be similar to the input pattern is obtained, the value of the hypothetic pattern forming parameter temporarily stored in the register section 81 is loaded, and the frequency distribution of the value of the hypothetic pattern forming parameter is stored in the hypothetic pattern forming parameter data base 82 in accordance with designation of the inference section 3.

The inference section 3 integrates messages accumulated in the attribute description region 2 by the above processing to determine the input character, and sends the determination result to the interface 6. In this determination, not only the message described in the attribute description region 2 by the above processing, but also logic information acquired by a means (not shown) is used. The logic information is used in the same manner as described above, and a description thereof will be omitted.

In the embodiment shown in FIG. 12, as in the embodiment shown in FIG. 1, when the inference section 3 pairs an obtained determination result and an input character pattern and supplies it to the pattern analyzer 1 as a learning pattern, and the pattern analyzer 1 additionally learns the supplied data, learning can be effectively performed.

As described above, according to the embodiment in FIG. 12, when a very ambiguous, incomplete input pattern is input, a certain pattern is formed as a hypothetic pattern, and the hypothetic pattern is compared with the input pattern. For this reason, an incomplete input pattern can be recognized. In addition, when a hypothetic pattern is formed with respect to the incomplete input pattern, a hypothetic pattern forming parameter is effectively generated by the hypothetic pattern forming parameter identification section 7. For this reason, a time required for setting the hypothetic pattern forming parameter can be shortened. In addition, when the pattern recognition apparatus has a function of forming a deformation pattern as a hypothetic pattern by itself, a large number of patterns need not be learned.

In each of the above embodiments, although a hypothetic pattern forming parameter identification section in which a value having a higher frequency is preferentially generated in accordance with the frequency distribution of the value of the hypothetic pattern forming parameter is used as the hypothetic pattern forming parameter identification section 7, the value of each parameter may have a generation probability proportional to the frequency according to the frequency distribution, or a database in which a hypothetic pattern forming parameter string is stored may be used.

An embodiment obtained by omitting the pattern analyzer 1 from the apparatus of the above embodiment to simplify the apparatus in consideration of the operation of the hypothetic pattern forming section 8 will be described below with reference to FIG. 15.

As shown in FIG. 15, the pattern recognition apparatus comprises an attribute description region 2, an inference section 3, a hypothetic pattern forming section 8, a comparator 5, and a hypothetic pattern forming parameter identification section 7. In other words, this embodiment has an arrangement obtained by omitting a pattern analyzer 1 from the arrangement of the embodiment shown in FIG. 12 to simplify the arrangement. In this case, the hypothetic pattern forming section 8 has a function of forming a deformation pattern as a hypothetic pattern by itself. For this reason, when the hypothetic pattern forming section 8 receives an input pattern, the hypothetic pattern forming section 8 forms a hypothetic pattern using the hypothetic pattern forming parameter generated by the hypothetic pattern forming parameter identification section 7, and the hypothetic pattern is compared with the input pattern by the comparator 5, thereby performing a pattern recognition processing. In addition, in this embodiment, as in the above embodiments, an ambiguous, incomplete input pattern can be recognized. In addition, since a hypothetic pattern forming parameter is efficiently set by the hypothetic pattern forming parameter identification section 7, a time required for setting the hypothetic pattern forming parameter can be shortened. The operation of each constituent part in this embodiment is the same as that in each of the above embodiments, and a description thereof will be omitted.

The pattern analyzer 1 may be omitted from each of the apparatuses shown in FIGS. 8 and 10, and the inference sections 31 and 32 may be omitted from the apparatus shown in FIG. 10. According to the present invention, only the following arrangement is required. In other words, when an input pattern is input, a hypothetic pattern is formed from the hypothetic pattern forming section 4, and the hypothetic pattern is compared with the input pattern by the comparator 5.

In a pattern recognition apparatus according to the present invention, since, in addition to a conventional bottom-up recognition processing, a top-down processing which forms a hypothetic pattern is employed, an ambiguous, incomplete input pattern can be recognized, and the number of learning patterns to be learned by a neural network can be effectively reduced.

In the pattern recognition apparatus according to the present invention, the above effect can be obtained, and a hypothetic pattern forming parameter is efficiently set by a hypothetic pattern forming parameter identification section. For this reason, a time required for setting the hypothetic pattern forming parameter can be shortened, and a pattern recognition processing can be performed at a high speed.

On the other hand, in the pattern recognition apparatus according to the present invention, when a pattern analyzer 1 is omitted, and an input pattern is input, a hypothetic pattern is formed from a hypothetic pattern forming section, and the hypothetic pattern can be compared with the input pattern by a comparator. In this case, the apparatus can be simplified, and the apparatus can recognize an incomplete input pattern.

In the pattern recognition apparatus according to the present invention, since a hypothetic pattern forming parameter can be efficiently set by a hypothetic pattern forming parameter identification section, a time required for setting the hypothetic pattern forming parameter can be shortened, and a pattern recognition processing can be performed at a high speed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A pattern recognition apparatus comprising:

pattern analyzing means for analyzing a degree of similarity between an input pattern and a learning pattern to output analysis result information;

hypothetic pattern forming means for forming, as a plurality of hypothetic patterns, a plurality of deformation patterns obtained by deforming a predetermined pattern representing the input pattern in accordance with the analysis result information from said pattern analyzing means;

comparing means for comparing the hypothetic patterns formed by said hypothetic pattern forming means with the input pattern to output similarity information;

storing means for storing the similarity information obtained by said comparing means and the analysis result information obtained by said pattern analyzing means; and inference means for, referring to the information stored in said storing means, outputting a pattern corresponding to the analysis information as a final recognition pattern when the analysis result information represents a pattern recognizable as only one pattern, and starting said hypothetic pattern forming means when the analysis result information represents a pattern able to be recognized as a plurality of patterns, such that said hypothetic pattern forming means generates the hypothetic patterns from said analysis result information.

2. An apparatus according to claim 1, wherein said hypothetic pattern forming means includes reference character means for forming, as the hypothetic patterns, a plurality of deformation character patterns obtained by deforming a typical character representing the input pattern on the basis of a hand movement characteristics model representing movement of handwriting a character.

3. An apparatus according to claim 2, wherein said hypothetic pattern forming means further includes reference character forming means for forming the typical character and means for outputting, as the hypothetic patterns, the deformation character patterns obtained by deforming the typical character in accordance with the hand movement characteristics model.

4. An apparatus according to claim 1, wherein said pattern analyzing means includes classifying means for analyzing the input pattern and classifying the input pattern into a first pattern category including a first pattern able to be recognized as a pattern recognizable as only one pattern or a second pattern category including a second pattern able to be recognized as a plurality of patterns, and feature analyzing means for extracting, when the input pattern belongs to the second pattern category, a feature of the input pattern, analyzing the extracted feature of the input pattern, and sending an analysis result to said storing means.

5. An apparatus according to claim 4, wherein said feature analyzing means includes means for extracting and analyzing a contour of an input pattern belonging to the second pattern category as a feature.

6. An apparatus according to claim 4, wherein said classifying means is constituted by a neural network having a learning function for storing a pattern corresponding to a final recognition result as learning data.

7. An apparatus according to claim 4, wherein said inference means is constituted by a first inference section connected in parallel to said storing means and said classifying means, a second inference section connected between said storing means and said feature analyzing means, and a third inference section connected between said storing means and said hypothetic pattern forming means.

8. An apparatus according to claim 1, wherein said hypothetic pattern forming means is constituted by a parameter generating section for storing, when a hypothetic pattern which is similar to the input pattern is obtained, a frequency distribution of hypothetic pattern forming parameters used to form the hypothetic pattern and sequentially generating the hypothetic pattern forming parameters, and a hypothetic pattern forming section for forming corresponding hypothetic patterns in an order of the generated hypothetic pattern forming parameters.

9. An apparatus according to claim 8, wherein said hypothetic pattern forming means includes means for forming, as the hypothetic patterns, the deformation character patterns obtained by deforming a typical character representing the input pattern on the basis of a hypothetic pattern forming parameter representing a hand movement characteristics model representing movement of handwriting a character.

10. An apparatus according to claim 8, wherein said parameter generating section is constituted by a register for temporarily storing a generated hypothetic pattern forming parameter, a parameter database for storing a frequency distribution of hypothetic pattern forming parameters generated when a recognizable hypothetic pattern is formed, and a hypothetic pattern forming parameter storing/generating section for loading, from said register, the hypothetic pattern forming parameters obtained when a recognizable hypothetic pattern is formed, in said parameter database as a frequency distribution, and generating a hypothetic pattern forming parameter in accordance with the frequency distribution of the hypothetic pattern forming parameters stored in said parameter database to write the hypothetic pattern forming parameter in said register.

11. A pattern recognition apparatus comprising:

pattern analyzing means for analyzing a similarity between an input pattern and a learning pattern to output analysis result information;

hypothetic pattern forming means for forming, as a plurality of hypothetic patterns, a plurality of deformation patterns obtained by deforming a predetermined pattern representing the input pattern;

parameter generating means for storing, when a hypothetic pattern representing the input pattern is formed, a frequency distribution of a hypothetic pattern forming parameter used for forming the hypothetic pattern representing the input pattern, and sequentially generating hypothetic pattern forming parameters in accordance with the frequency distribution;

comparing means for comparing the input pattern with the plurality of hypothetic patterns formed by said hypothetic pattern forming means in accordance with the hypothetic pattern forming parameters generated by said parameter generating means;

storing means for storing information regarding a comparison result obtained by said comparing means and said analysis result information obtained by said pattern analyzing means; and inference means for outputting, referring to the analysis result information stored in said storing means and the input pattern, a pattern corresponding to the analysis result information as a final recognition result when the analysis result information represents a character pattern recognizable as only one pattern, and starting said hypothetic pattern forming means when the analysis result information represents a character pattern able to be recognized as a plurality of characters, such that said hypothetic pattern forming means generates the hypothetic patterns from said analysis result information.

12. An apparatus according to claim 11, wherein said pattern analyzing means has a neural network which can perform learning on the basis of learning data, and additionally performs learning using said neural network on the basis of learning data obtained by pairing a determination result obtained by said inference means and the input pattern.

\* \* \* \* \*